Patented Apr. 8, 1930

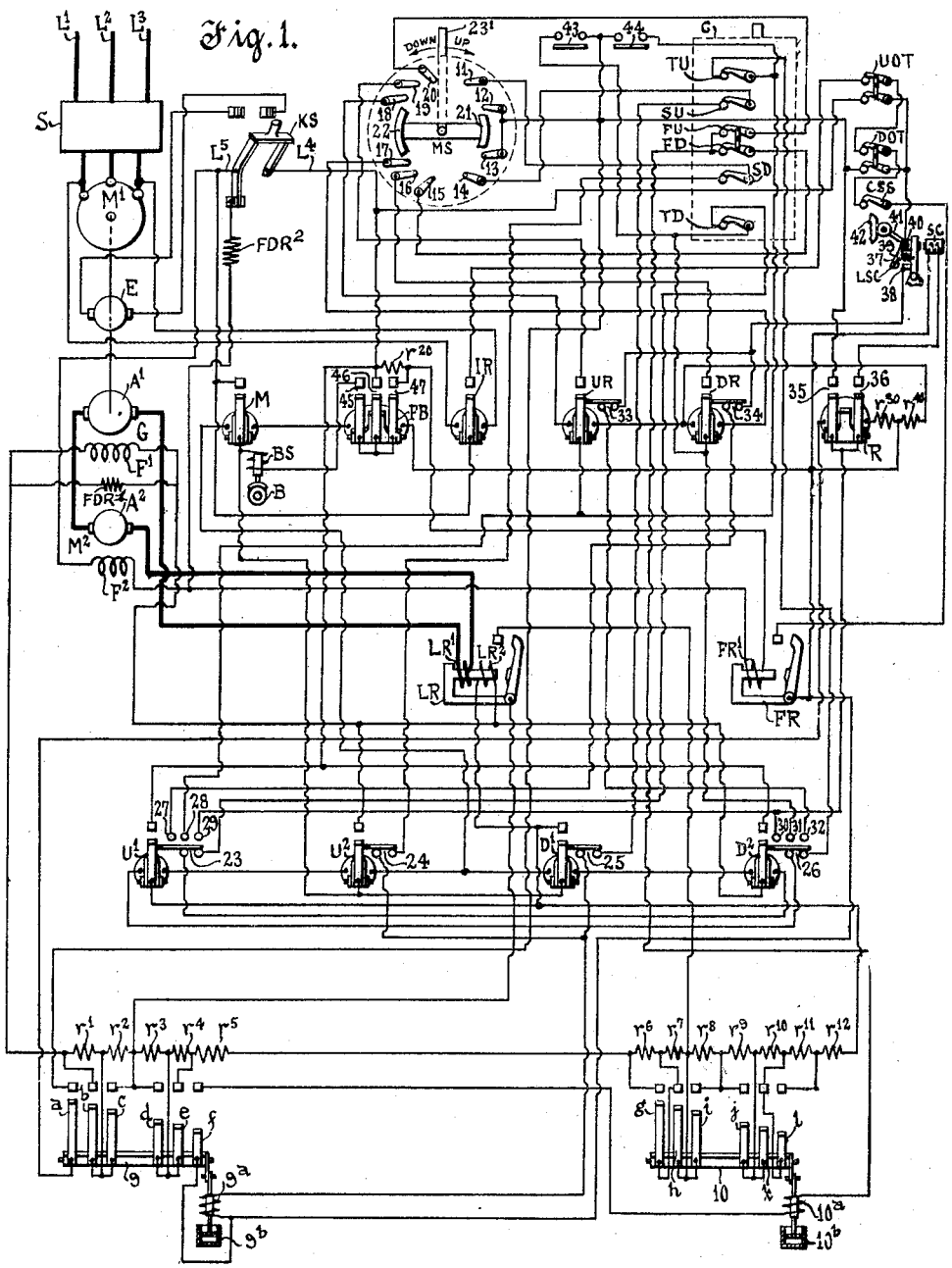

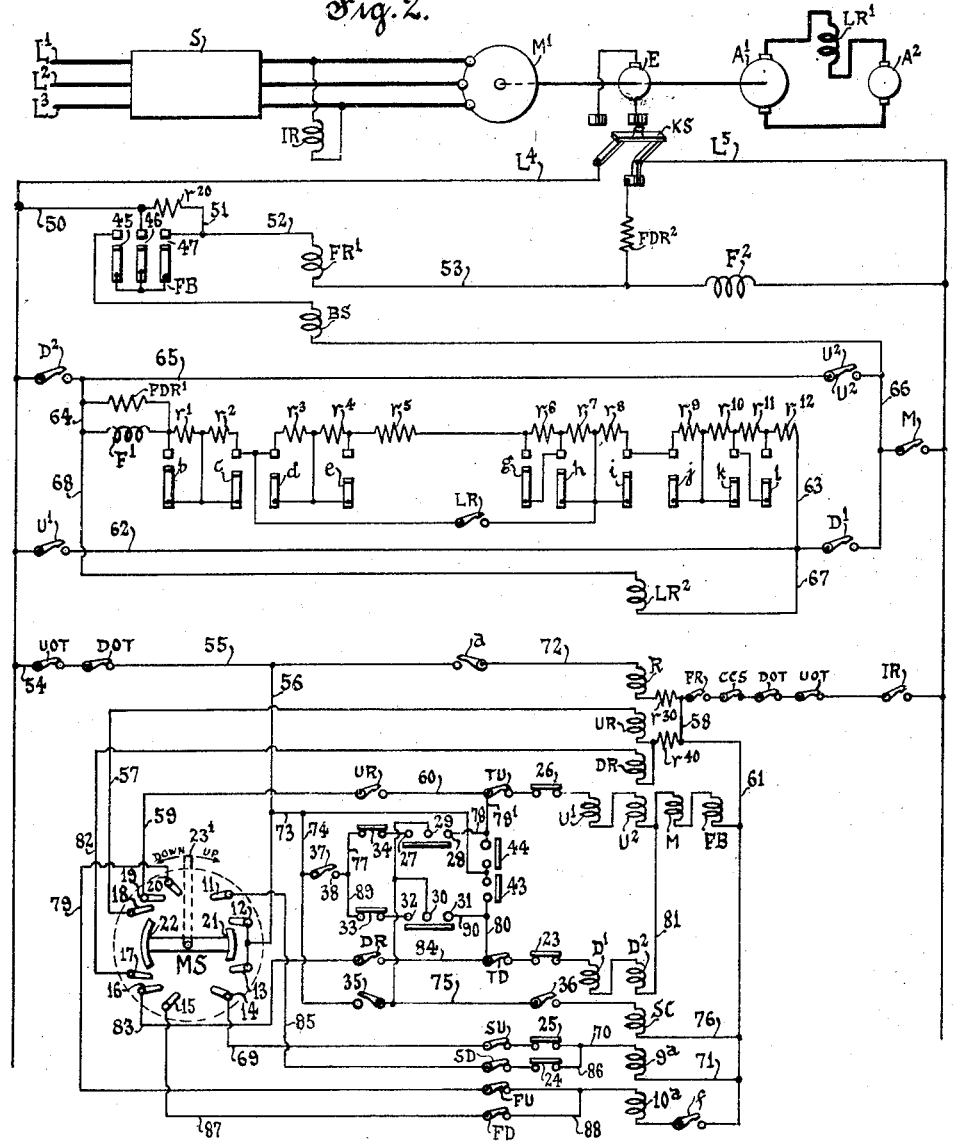

1,753,351

UNITED STATES PATENT OFFICE

EDWIN W. SEEGER, OF SOUTH MILWAUKEE, WISCONSIN, ASSIGNOR, BY MESNE ASSIGNMENTS, TO CUTLER-HAMMER, INC., OF MILWAUKEE, WISCONSIN, A CORPORATION OF DELAWARE

MOTOR-CONTROL SYSTEM FOR ELEVATORS AND THE LIKE

Application filed December 29, 1926. Serial No. 157,739.

This invention relates to motor control systems for elevators and the like.

While I have shown my invention as applied to variable voltage control systems of the type disclosed in my co-pending application, Serial No. 57,513, filed September 21, 1925, it is to be understood that certain features thereof are likewise applicable to other types of control systems.

An object of the invention is to provide means for effecting accurately positioned stopping of a driven member through automatic plugging of the driving motor after manually controlled initiation of the stopping operation.

Another and more specific object is to provide novel means for insuring accurately positioned stopping of an elevator car or the like at any desired landing.

Another object is to provide novel means for effecting slow-down and stopping of the car by plugging of the driving motor.

Another and more specific object is to provide means for insuring initiation of the slow-down and plugging operation when the car is definitely positioned with respect to a given landing.

Other objects and advantages of the invention will hereinafter appear.

The accompanying drawing illustrates one embodiment of the invention which will now be described, it being understood, that the embodiment illustrated is susceptible of modification without departing from the spirit and scope of my invention as defined in the appended claims.

In the drawing,

Figure 1 is a diagrammatic view of a preferred form of the controller; and

Fig. 2 is an across-the-line diagram of the circuits and connections illustrated in Fig. 1.

Referring to Fig. 1, $M^1$ designates the motor and G the generator of a motor generator set. Motor $M^1$ may be of any suitable type, and is shown as supplied with current from a three phase alternating current source indicated by lines $L^1$, $L^2$ and $L^3$. Motor $M^1$ is adapted to be started and stopped by any suitable type of controller, indicated generally at S. $A^1$ designates the armature and $F^1$ the field of the generator G; whereas $A^2$ designates the armature and $F^2$ the field of a motor $M^2$ adapted to be supplied with current from said generator. The fields $F^1$ and $F^2$ of generator G and motor $M^2$, respectively, are supplied with current from any suitable direct current source; the same being shown as supplied with current through lines $L^4$ and $L^5$ from an exciter E also driven by the motor $M^1$, and a knife switch KS may be provided for connecting and disconnecting said fields from said source.

As set forth in my application aforementioned, motor $M^2$ is adapted to be accelerated, decelerated and reversed by increasing or decreasing the voltage or reversing the connections of the field $F^1$ of the generator G. The field $F^1$ of the generator G is controlled through the medium of a single pole electromagnetic switch M and two sets of single pole electromagnetic reversing switches $U^1$—$U^2$ and $D^1$—$D^2$, and the strength of said field is regulated by means of resistance sections $r^1$ to $r^{12}$, inclusive. Resistance sections $r^1$ to $r^4$, inclusive, are controlled by an electromagnetically operated resistance varying device 9, whereas resistance sections $r^6$ to $r^{11}$, inclusive, are controlled by an electromagnetically operated resistance varying device 10. The amount of resistance in section $r^{12}$ is determined in accordance with the conditions involved in a given installation, whereas if desired means may be provided for varying the value of said resistance at will. An electromagnetically operated relay LR is provided for establishing a shunt circuit around resistance sections $r^3$ to $r^7$, inclusive, for purposes hereinafter set forth.

More specifically, resistance varying devices 9 and 10 are provided with electromagnetic operating windings $9^a$ and $10^a$, respectively; whereas said devices are also provided with a plurality of contact fingers $a$ to $f$ and $g$ to $l$, respectively, adapted to close successively upon energization of their respective windings. Opening and closing movements of the contact fingers of devices 9 and 10 are retarded by means of the dashpots $9^b$ and $10^b$.

Relay LR is of the normally open type, the same having two operating windings $LR^1$ and $LR^2$, the former being included in circuit in series with the armatures of generator G and motor $M^2$, and the latter being adapted to be connected across lines $L^4$ and $L^5$ upon closure of switch M and either set of reversing switches $U^1$—$U^2$ or $D^1$—$D^2$. The field $F^2$ of motor $M^2$ is normally connected across lines $L^4$ and $L^5$ through the medium of a resistance $r^{20}$, and a normally open electromagnetic relay FB is provided for shunting said resistance and also for establishing an energizing circuit for the solenoid BS of a normally engaged electromagnetic brake B associated with motor $M^2$.

Switch M, reversing switches $U^1$—$U^2$ and $D^1$—$D^2$ and the resistance varying devices 9 and 10 are all controlled by a master switch MS, said master switch being provided with stationary contacts 11 to 20, inclusive, and a pair of electrically connected movable contactors 21 and 22. Contactor 21 is operable by means of handle $23^1$ to sequentially engage contacts 13 and 14 during sequential engagement of contactor 22 with contacts 18, 19 and 20, whereas said contactor 21 is also movable in the opposite direction by said handle to sequentially engage contacts 12 and 11 during sequential engagement of contactor 22 with contacts 17, 16 and 15.

The hereindescribed control system also includes limit switches UOT and DOT for preventing overtravel of the car in the upward or downward direction, a car safety switch CSS, and a normally open relay FR, all of which are arranged in series in the energizing circuits extending through master switch MS. Relay FR is provided with an operating winding $FR^1$ connected in series with the field $F^2$ of motor $M^2$.

Reversing switches $U^1$—$U^2$ and $D^1$—$D^2$ are provided with normally closed auxiliary contacts 23, 24, 25 and 26, respectively, whereas switch $U^1$ is additionally provided with normally open auxiliary contacts 27, 28 and 29 and switch $D^2$ is additionally provided with normally open auxiliary contacts 30, 31 and 32.

The control system as thus far described corresponds substantially with that disclosed in my application aforementioned; whereas for accomplishment of the purposes herein contemplated I additionally provide three electromagnetically operable relays, designated by the reference characters UR, DR and R in Fig. 1. As shown the relays UR and DR are of the single pole type, the former being provided with normally closed auxiliary contacts 33, and the latter being provided with normally closed auxiliary contacts 34. Relay R is of the double pole type, the contacts thereof being designated by the numerals 35 and 36.

A retiring limit switch LSC is adapted to be mounted upon the car, said switch having contacts 37 and 38 normally biased to closed position by means of the tension spring 39, or in any other suitable manner. Contact 37 is pivotally supported, as indicated at 40, whereas the same is provided with a cam engaging extension 41; said extension being adapted to engage any one of the cams located in the hatchway adjacent to the respective landings, under given conditions as hereinafter set forth. One of said cams is illustrated diagrammatically at 42; whereas said switch is adapted to be moved bodily and held out of alinement with said cams upon energization of the solenoid SC associated therewith, thereby permitting closure of said switch under the action of spring 39.

I also provide means having normally open contacts 43 adapted to be closed during operation of motor $M^2$ above a predetermined speed and in a direction to effect movement of the car in an upward direction, and normally open contacts 44 adapted to be closed during operation of motor $M^2$ above a predetermined speed and in a direction to effect movement of the car in a downward direction. Said means may comprise a pair of positive displacement fluid pumps of the type disclosed in the co-pending application of Charles E. Carpenter, Serial No. 731,282, filed August 11, 1924; both of said pumps being geared to, or driven at a speed directly proportional to the speed of, the elevator motor $M^2$. Said pumps are also preferably reversely arranged in such manner that the pressure operated contacts 43 of one of the same will be closed and maintained closed during operation of the elevator motor at or above a given speed in one direction and the pressure operated contacts 44 of the other pump will be closed and maintained closed during operation of said motor at or above a given speed in the opposite direction. Thus upon plugging of the motor in the manner hereinafter described one of the sets of contacts will be maintained closed until as a result of the plugging operation the motor is brought substantially to a dead stop whereupon said contacts are immediately opened to effect interruption of the motor circuit.

While I have referred to the use of a pair of motor driven fluid pumps of the above character, it will be apparent to those skilled in the art that a single pump may be rendered capable of performing the functions of both, by the addition of suitable check valve mechanism for reversing the direction of flow of the fluid from the discharge side of the pump in accordance with the direction of operation of the motor. Similarly it will be apparent that other types of contacting mechanism may be employed for distinguishing between one direction of operation of the motor and the other. Such a device is disclosed, for instance, in the patent to Steckel No. 934,104, dated September 14, 1909.

I preferably provide a normally open relay IR to additionally control continuity of the various control circuits, said relay having an operating winding to be permanently connected across one phase of the supply circuit for motor $M^1$.

Reference character C designates generally a plurality of normally closed rotating cam operated limit switches carried by the car, said switches being operable automatically and selectively in accordance with the position of the car. Thus switches TU and TD serve as additional means to limit travel of the car in an upward or downward direction; switches SU and SD serve under given conditions to insure initiation of the slowdown operation of the control system; whereas switches FU and FD likewise serve under given conditions to control the fast speed operating connections of the motor control system. Said cam-operated limit switches are of well known construction and form no part of the present invention; hence more specific description thereof is deemed unnecessary.

Operation of the system will now be described with particular reference to the diagram of Fig. 2. Thus, assuming positioning of the car at a given landing, the contacts 37 and 38 of the retiring limit switch LSC will be held in open position by the means illustrated in Fig. 1; whereas with the circuit of motor $M^1$ completed the winding of relay IR will be energized to effect closure of the contacts of the latter, and assuming closure of switch KS an energizing circuit will be provided for the winding $FR^1$ of relay FR to effect closure of the contacts of the latter. Said circuit may be traced from line $L^4$ by conductor 50, through field protective resistance $r^{20}$, conductors 51 and 52 and said winding $FR^1$, and by conductor 53 through shunt field winding $F^2$ to line $L^5$.

If the master switch MS is moved to the first position for effecting upward movement of the elevator car, a circuit will be completed for the winding of up relay UR. Said circuit may be traced from line $L^4$ by conductor 54 through certain of the contacts of limit switches UOT and DOT, conductors 55 and 56 and contact 13 of master switch MS, to connected contactors 21 and 22, contact 18 and conductor 57, through the winding of said relay UR, protective resistance $r^{40}$, by conductor 58 through the contacts of relay FR, car safety switch CSS, through the other contacts of overtravel limit switches DOT and UOT, and thence through the contacts of relay IR to line $L^5$. Relay UR in closing effects opening of its auxiliary contacts 33.

Also in said first position of master swicth MS contactor 22 engages contact 19, whereby upon closure of the main contacts of relay UR in the manner aforedescribed an energizing circuit is provided for the windings of up direction switches $U^1$ and $U^2$, main switch M and relay FB. Said circuit extends from line $L^4$ to contactor 22, as heretofore traced, thence to contact 19, by conductor 59 through the contacts of said relay UR, by conductor 60 through the contacts of cam operated switch TU, normally closed auxiliary contacts 26 of switch $D^2$, thence through the windings of switches $U^1$, $U^2$, M and relay FB in series, by conductors 61 and 58 through the contacts of relay FR, and thence to line $L^5$ as previously traced.

Relay FB in closing is adapted, through its contacts 46 and 47 to shunt the protective resistance $r^{20}$, thereby providing for full strength of the shunt field $F^2$. Similarly, said relay is adapted through closure of its contacts 46 and 45 to provide an energizing circuit for the brake coil BS to effect release of brake B, said circuit being obvious; it being noted that the winding of switch M has been energized in the manner aforedescribed, whereby the contacts thereof are closed.

Switches $U^1$ and $U^2$ in closing complete an energizing circuit for the field winding $F^1$ of generator G, said circuit extending from line $L^4$ through the contacts of switch $U^1$, conductors 62 and 63 through resistance $r^{12}$ to $r^1$, inclusive, thence through said field $F^1$, conductors 64 and 65 through the contacts of switch $U^2$, conductor 66 through the contacts of swicth M, and thence to line $L^5$. A parallel circuit is likewise provided for the winding $LR^2$ of relay LR, said circuit extending from line $L^4$ through contacts of switch $U^1$, by conductors 62 and 67 through said winding $LR^2$, by conductors 68, 64 and 65 to line $L^5$ as previously traced.

When the master switch is moved in a clockwise direction to the second position, contactor 21 is brought into engagement with contact 14, thereby completing an energizing circuit for the operating winding $9^a$ of the resistance varying device 9. Said circuit extends from line $L^4$ to contact 13, as heretofore traced, thence through bridging contactor 21 and contact 14, conductor 69 and contacts of cam operated switch SU, thence through the normally closed auxiliary contacts 25 of switch $D^1$, conductor 70 and said winding $9^a$, conductors 71, 61 and 58 and the contacts of relay FR to line $L^5$ as previously traced. Device 9 thereupon tends to close its contacts $a$ to $f$, subject to the retarding action of dashpot $9^b$; whereas upon closure of the first contact $a$, an energizing circuit is completed for the winding of relay R. Said circuit may be traced from line $L^4$ to conductor 55 as previously traced, thence through said contacts $a$ of device 9, conductor 72 and winding of relay R, thence through protective resistance $r^{30}$ and the contacts of relay FR to line $L^5$ as previously traced.

Upon closure of contacts 35 and 36 of relay R an energizing circuit is provided for the winding SC of the retiring limit switch LSC. Said circuit extends from line $L^4$ to conductor 55 as previously traced, thence by conductors 56, 73 and 74 through contacts 35, conductor 75, contacts 36 and said winding SC, conductors 76, 61 and 58 through the contacts of relay FR and thence to line $L^5$ as previously traced. With winding SC thus energized switch LSC is retired or retracted to permit closure of contacts 37, 38 of the latter under the action of spring 39 (Fig. 1). A maintaining circuit for the windings of switches $U^1$, $U^2$ and M and relay FB is thereupon provided, which circuit extends from line $L^4$ to conductor 74 as previously traced, through said contacts 37, 38, conductor 77 and normally closed auxiliary contacts 34 of relay DR, through normally open contacts 27 and 28 of switch $U^1$, conductors 78 and $78^1$, contacts of cam operated switch TU and the normally closed auxiliary contacts 26 of switch $D^2$, and thence through the windings of switches $U^1$, $U^2$ and M and relay FB to line $L^5$ in the manner previously traced.

Continued energization of the winding $9^a$ of resistance varying device 9 effects sequential closure of the contacts $b$ to $e$ thereof to gradually exclude resistance sections $r^1$ to $r^4$, inclusive, from the circuit of field $F^1$ to increase the strength of the latter and thus bring motor $M^2$ up to second speed, as described in my application aforementioned. Similarly, upon movement of master switch MS in a clockwise direction to the third speed position contactor 22 is brought into engagement with contact 20, to thereby provide an energizing circuit for the winding $10^a$ of resistance varying device 10, subject however to complete operation of device 9 including closure of the contacts $f$ of the latter. Said circuit may be traced from line $L^4$ to contactor 22 as aforedescribed, thence to contact 20, by conductor 79 through the contacts of cam operated switch FU, winding $10^a$ and contacts $f$ of device 9, conductors 61 and 58 through the contacts of relay FR, and to line $L^5$ as heretofore traced. Device 10 thereupon acts to effect sequential closure of its contacts $g$ to $l$, inclusive, to gradually exclude resistance sections $r^6$ to $r^{11}$, inclusive, from the circuit of generator field $F^1$, thereby bringing motor $M^2$ up to third or full speed.

The normally open contacts of relay LR are controlled jointly by the coil $LR^1$ connected in series between the armature $A^1$ of generator G and the armature $A^2$ of motor $M^2$, and the shunt coil $LR^2$ which is controlled by switch M and either of the two sets of reversing switches $U^1$, $U^2$ and $D^1$, $D^2$. As hereinbefore set forth the relay LR is adapted when closed to shunt resistance sections $r^3$ to $r^7$, inclusive. It is apparent from Fig. 2 that upon reversal of the field $F^1$ of the generator the polarity of the shunt coil $LR^2$ is also reversed and said shunt coil is arranged so that when the motor is receiving current from the generator the same will act cumulatively with the coil $LR^1$. Coil $LR^2$ thus serves to assist coil $LR^1$ to effect response of relay LR when the motor $M^2$ receives current from the generator and to oppose coil $LR^1$ when the motor acts as a generator. Coil $LR^1$ is calibrated to effect response of relay Lr upon the initial rush of starting current to the motor and to permit dropping out of relay LR when the current supplied to the motor drops to a given value. In other words, coil $LR^1$ effects response of relay LR during both raising and lowering of the load, but if the motor tends to act as a generator during lowering of the load, said coil will insure opening of said relay.

Furthermore, during raising of the load, coil $LR^1$ tends to hold relay LR closed if the load is above a given value and permits dropping out of said relay if the load on the motor is below a given value whereby said relay tends to maintain the speed of the motor constant for a given setting of the master switch. It should be noted that upon response of relay LR the amount of resistance excluded thereby is dependent upon the position of resistance varying devices 9 and 10. In other words, relay LR shunts more resistance during slow speed operation of the motor than at high speed operation thereof and in practice it has been found that such action of the relay LR tends to provide smooth and rapid acceleration of the driving motor under varying conditions.

As aforeindicated, the means responsive to the direction of operation of motor $M^2$ effects closure of contacts 43 when said motor is traveling in a direction to effect upward movement of the car. Thus, assuming full speed operation of motor $M^2$ for upward travel of the car, the latter may be accurately stopped at any desired landing, by returning the master switch MS to intermediate or off position after the car has passed the landing preceding that at which it is desired to stop the car. Such off positioning of switch MS will effect deenergization of the windings $9^a$ and $10^a$ of devices 9 and 10, respectively, to decelerate motor $M^2$ to a slow speed. When the last contact $a$ of device 9 opens, the energizing circuit of the winding of relay R is interrupted, and the contacts 35 and 36 open to interrupt the aforedescribed energizing circuit of the winding SC of limit switch LSC to permit the extension 41 (Fig. 1) of the latter to fall into a position to be engaged by a cam adjacent the landing. The car continues to move upwardly until extension 41 engages said cam, thereby opening contacts 37, 38 to interrupt the aforedescribed maintaining circuit of the windings $U^1$, $U^2$, M and FB, thus effecting opening of the up direction contactors.

However, the contacts 43 have been closed in the manner aforedescribed, whereby upon opening of switch $U^1$ the auxiliary contacts 23 thereof are closed to complete an energizing circuit for the windings of the down direction switches $D^1$, $D^2$ and the windings M and FB. Said circuit may be traced from line $L^4$ to conductor 73 as aforedescribed, through contacts 43 of the device responsive to the speed and direction of operation of motor $M^2$, by conductor 80 through the contacts of cam operated switch TD, normally closed auxiliary contacts 23 of switch $U^1$ and windings $D^1$, $D^2$, by conductor 81 through windings M and FB, and thence to line $L^5$ as heretofore traced.

With switches $D^1$, $D^2$ closed in this manner the direction of current flow through the field $F^1$ of generator G is reversed, thereby reversing the direction of flow of current through the armatures $A^1$ and $A^2$ of generator G and motor $M^2$, respectively, which results in slowing down and stopping of the latter by plugging. Just before the motor $M^2$ starts to operate in the reverse direction, the contacts 43 are automatically opened in the manner aforementioned, to interrupt the energizing circuit of windings $D^1$, $D^2$, M and FB, as will be obvious. Relay FB in opening, through opening of its contacts 45 and 46, interrupts the energizing circuit of brake coil BS to permit application of the brake B.

All of the elements aforedescribed are reset to thereafter permit operation of motor $M^2$ for movement of the car in an upward or downward direction. Subsequent operation of the control system for effecting movement of the car upwardly will be apparent from the foregoing description.

However, if it is desired to effect downward movement of the car, master switch MS is moved in a counterclockwise direction to its first position, thereby effecting engagement of contactor 21 with contact 12, and engagement of contactor 22 with contacts 17 and 16. An energizing circuit for the winding of relay DR is thus provided, which circuit extends from line $L^4$ by conductor 54 through contacts of limit switches UOT and DOT, conductors 55, 56, contact 12, contactor 21 to contactor 22 and contact 17, conductor 82 through the winding of relay DR and protective resistance $r^{40}$, conductor 58 through the contacts of relay FR, and thence to line $L^5$ as heretofore traced. Relay DR in closing effects opening of its auxiliary contacts 34.

Closure of the main contacts of relay FR under the aforementioned conditions effects completion of an energizing circuit for windings $D^1$, $D^2$, M and FB, which circuit extends from line $L^4$ to contactor 22 as just traced, thence through contact 16, conductor 83 and said DR contacts, by conductor 84 through contacts of cam operated switch TD and the normally closed auxiliary contacts 23 of switch $U^1$, thence through windings $D^1$ and $D^2$, by conductor 81 through windings M and FB, and by conductors 61, 58 and contacts of relay FR to line $L^5$, as previously traced.

Similarly, upon movement of master switch MS in a counterclockwise direction to the second position, contactor 21 is brought into engagement with contact 11, thus completing an energizing circuit for the winding $9^a$ of resistance varying device 9. Said circuit extends from line $L^4$ to contact 12 and contactor 21 as aforedescribed, thence through contact 11, conductor 85, contacts of cam operated switch SD, normally closed auxiliary contacts 24 of switch $U^2$, by conductors 86 and 70 through said winding $9^a$, and by conductors 71, 61 and 58 to line $L^5$ as previously traced. Upon closure of the last contact $f$ of device 9, winding $10^a$ of device 10 may be energized by movement of master switch MS in a counterclockwise direction to its third or high speed position, thereby effecting engagement of contactor 22 with contact 15. The energizing circuit thus provided may be traced from line $L^4$ to contactor 22 as aforedescribed, thence through contact 15, conductor 87 and contacts of cam operated switch FD, conductor 88 through said winding $10^a$ and the contacts $f$ of device 9, and by conductors 61 and 58 to line $L^5$ as heretofore traced.

The contacts $a$ of device 9 operate in the manner aforedescribed to complete an energizing circuit for the winding of relay R, whereas said relay through closure of its contacts 35 and 36 provides an energizing circuit for the coil SC of retiring limit switch LSC. The latter is thereby retracted to permit closure of its contacts 37, 38 whereas by closure of normally open auxiliary contacts 31 and 32 of switch $D^2$ a maintaining circuit is provided for windings $D^2$, $D^1$, M and FB. Said circuit extends from line $L^4$ to conductors 73 and 74 as heretofore traced, through said contacts 37, 38, conductor 89 and normally closed auxiliary contacts 33 of relay UR, thence through said auxiliary contacts 32 and 31, conductors 90 and 80 and the contacts of cam operated switch TD, thence through normally closed auxiliary contacts 23 of switch $U^1$, through windings $D^2$, $D^1$, conductor 81 and windings M and FB, and by conductors 61 and 58 to line $L^5$ as previously traced.

With motor $M^2$ thus operating in a reverse direction from that first described, contacts 44 of the device responsive to speed and direction of motor $M^2$ will be closed; whereby upon movement of master switch MS to off position the winding of relay DR and the windings $9^a$ and $10^a$ of devices 9 and 10 are deenergized. Thus upon opening of contact $a$ of device 9 the winding of relay R is energized, and the contacts 35 and 36 of the latter in opening effect deenergization of the winding SC of retiring limit switch LSC, as aforedescribed.

Thereafter contacts 37, 38 of switch LSC are opened through engagement of extension 41 (Fig. 1) with a cam adjacent to the landing at which it is desired to stop the car, to effect interruption of the aforedescribed maintaining circuit for windings $D^2$, $D^1$, M and FB. Normally closed auxiliary contacts 26 of switch $D^2$ in reclosing complete an energizing circuit for windings $U^1$, $U^2$, M and FB; said circuit extending from line $L^4$ to conductor 73 as aforedescribed, thence through said contacts 44, conductor $78^1$ and contacts of cam operated switch TU and normally closed auxiliary contacts 26 of switch $D^2$, through said windings $U^1$, $U^2$, M and FB, and by conductors 61 and 58 to line $L^5$ as heretofore traced. Motor $M^2$ is thus brought to a stop by plugging in the manner aforedescribed, whereas said contacts 44 are opened just prior to reversal of the operation of motor $M^2$.

Field windings $F^1$ and $F^2$ are preferably provided with field discharge resistances $FDR^1$ and $FDR^2$, respectively.

What I claim as new and desire to secure by Letters Patent is:

1. In combination, a reciprocating carrier, a motor for driving said carrier, means operable at any point in the line of travel of said carrier for initiating operation of said motor in reverse directions selectively, said means being also operable to initiate stopping of the motor, and means thereafter operable automatically in accordance with the position of the carrier to effect stopping of the motor by plugging, whereby the same is stopped with said carrier accurately positioned at a preselected point in its line of travel.

2. In combination, a reciprocating carrier, a motor for driving said carrier, means operable at any point in the line of travel of said carrier for initiating operation of said motor in reverse directions selectively, manually operable means for initiating stopping thereof by plugging, and means operable automatically for rendering said stopping means ineffective pending positioning of the carrier at a preselected point in its line of travel, said stopping means including means responsive to the speed of operation of the motor and operable automatically to interrupt the power supply for the motor upon completion of the plugging operation.

3. In combination, an elevator car, a motor for driving said car, means for initiating operation of said motor in reverse directions selectively, and means for effecting stopping thereof by plugging, means for rendering said stopping means ineffective pending given positioning of the car with respect to a landing, said stopping means including means responsive to the speed and direction of operation of the motor and operable automatically to interrupt the power supply for the motor upon completion of the plugging period.

4. In an elevator control system, in combination, an elevator driving motor, circuit connections to provide for operation of said motor in reverse directions selectively, a manually operable master switch and electroresponsive means controlled thereby for selecting the connections for effecting operation of said motor in a given direction, means responsive to the speed and direction of operation of said motor for presetting the reverse connections for completion upon interruption of said first mentioned connections, means including said master switch for tending to effect interruption of said first mentioned connections, and means for rendering said last mentioned means ineffective pending given positioning of the elevator car with respect to a landing and adapted upon such positioning of the elevator to automatically complete said reverse connections to provide for stopping of said motor by plugging.

5. The combination with an elevator driving motor and a generator for supplying current thereto, of a field for said generator and a plurality of electroresponsive switches adapted when energized to respectively provide reverse connections for said field, manually operable means movable from neutral position for effecting energization of certain of said switches selectively to provide for operation of said motor in a given direction, means comprising cooperating elements on the car and in the hatchway adapted upon neutral positioning of said manually operable means to provide for continued energization of said last mentioned switches pending movement of the car to a point adjacent the next succeeding landing, and means responsive to the direction of operation of said motor and adapted upon deenergization of said last mentioned switches to complete an energizing circuit for other of said switches, to thereby reverse the flow of current through said generator field and thus effect stopping of said motor by plugging.

6. The combination with an elevator driving motor and a generator for supplying current thereto, of a field for said generator and a plurality of electroresponsive switches adapted when energized to respectively provide reverse connections for said field, manually operable means movable from neutral position for effecting energization of certain of said switches selectively to provide for operation of said motor in a given direction, means comprising cooperating elements on the car and in the hatchway adapted upon neutral positioning of said manually operable means to provide for continued energization of said last mentioned switches pending movement of the car to a point adjacent the next succeeding landing, and means responsive to the direction of operation of said motor and adapted upon deenergization of said last mentioned switches to complete an energizing circuit for other of said switches, to thereby reverse the flow of current through said generator field and thus effect stopping of said motor by plugging, said last mentioned means being adapted to automatically interrupt said last mentioned energizing circuit when said motor is brought to a stop.

7. The combination with an elevator driving motor and a generator for supplying current thereto, of a field for said generator and electroresponsive switches adapted when energized selectively to provide reverse connections for said field, an electromagnetically releasable brake for said motor, means for effecting release of said brake automatically upon completion of the energizing circuit of certain of said switches to thereby provide for operation of said motor in a given direction, means tending to interrupt said energizing circuit at will, means for insuring maintenance of said circuit pending movement of the car to a point adjacent the next succeeding landing and for thereupon interrupting the same, said means comprising cooperating elements on the car and in the hatchway, means responsive to the direction of operation of said motor and operable upon interruption of said energizing circuit to complete an energizing circuit for the other of said electroresponsive switches, whereby the flow of current through said generator field is reversed to effect stopping of said motor by pluggging, said last mentioned means being also operable during stopping of said motor to effect disconnection of said field and application of said brake.

8. In a control system, in combination, an elevator car, a motor for driving the same, a generator for supplying current to said motor, a field for said generator, manually operable means and electroresponsive switches controlled thereby to selectively provide reverse connections for said field, means operable upon establishment of given connections to insure maintenance thereof pending given positioning of the car with respect to a landing, said means comprising cooperating members on the car and in the hatchway, and means adapted upon interruption of said last mentioned connections to provide reverse connections for said field whereby the motor may be stopped by plugging, said means comprising a device responsive to the speed and direction of operation of said motor and operable to preset the energizing circuit of certain of said electroresponsive switches for completion upon interruption of the energizing circuit of other of the same.

9. In a control system, in combination, an elevator car, a motor for driving the same, a generator for supplying current to said motor, a field for said generator, manually operable means and electroresponsive switches controlled thereby to selectively reverse connections for said field, means operable upon establishment of given connections to insure maintenance thereof pending given positioning of the car with respect to a landing, said means comprising cooperating members on the car and in the hatchway, and means adapted upon interruption of said last mentioned connections to provide reverse connections for said field whereby the motor may be stopped by plugging, said means comprising a device responsive to the speed and direction of operation of said motor and operable to preset the energizing circuit of certain of said electroresponsive switches for completion upon interruption of the energizing circuit of the other of the same, said last mentioned means being also operable to interrupt the energizing circuits of all of said electroresponsive switches upon completion of the plugging operation.

10. In a control system, in combination, an elevator car, a motor for driving the same, a generator for supplying current to said motor, an exciting field for said generator, and means comprising a master switch movable in opposite directions from neutral position and a plurality of electroresponsive switches selectively controlled thereby to provide reverse connections for said field, a plurality of resistance sections to be initially included in circuit with said field and electroresponsive means also controlled by said master switch to provide for gradual exclusion and reinclusion of said resistance sections, means adapted upon completion of given connections for said field to insure maintenance thereof pending movement of said master switch to neutral position, and means for thereafter additionally insuring maintenance of said connections pending given positioning of the car with respect to the next succeeding landing, said means comprising cooperating elements on the car and in the hatchway, means adapted upon interruption of said first mentioned connections to provide reverse connections for said field whereby the motor may be stopped by plugging, said last mentioned means including means responsive to the speed and direction of operation of the motor and adapted upon deenergization and opening of certain of said electroresponsive switches to provide for energization and closure of other of the same.

11. In a control system, in combination, an elevator car, a motor for driving the same, a generator for supplying current to said motor, an exciting field for said generator, and means comprising a master switch movable in opposite directions from neutral position and a plurality of electroresponsive switches selectively controlled thereby to provide reverse connections for said field, a plurality of resistance sections to be initially included in circuit with said field and electroresponsive means also controlled by said master switch to provide for gradual exclusion and reinclusion of said resistance sections, means adapted upon completion of given connections for said field to insure maintenance thereof pending movement of said master switch to neutral position, and means for thereafter additionally insuring maintenance of said connections pending given positioning of the car with respect to the next succeeding landing, said means comprising cooperating elements on the car and in the hatchway, means adapted upon interruption of said first mentioned connections to provide reverse connections for said field whereby the motor may be stopped by plugging, said last mentioned means including means responsive to the speed and direction of operation of the motor and adapted upon de-energization and opening of certain of said electroresponsive switches to provide for energization and closure of other of the same, said speed and direction responsive means being also operable to interrupt the energizing circuits of all of said electroresponsive switches upon stopping of the motor by plugging.

In witness whereof, I have hereunto subscribed my name.

EDWIN W. SEEGER.